US010528816B2

(12) United States Patent
Desai et al.

(10) Patent No.: US 10,528,816 B2
(45) Date of Patent: Jan. 7, 2020

(54) SYSTEM AND METHOD FOR RETRIEVING AND DISPLAYING SUPPLEMENTAL INFORMATION AND PERTINENT DATA USING AUGMENTED REALITY

(71) Applicant: salesforce.com, inc., San Francisco, CA (US)

(72) Inventors: Sachin Desai, Sanfrancisco, CA (US); Eugene Oksman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 250 days.

(21) Appl. No.: 15/826,802

(22) Filed: Nov. 30, 2017

(65) Prior Publication Data

US 2019/0163975 A1 May 30, 2019

(51) Int. Cl.
*G06K 9/00* (2006.01)
*G06K 9/62* (2006.01)
*G06K 9/32* (2006.01)
*G06F 16/951* (2019.01)
*G06F 16/583* (2019.01)
*G06T 11/60* (2006.01)

(52) U.S. Cl.
CPC ..... *G06K 9/00671* (2013.01); *G06F 16/5838* (2019.01); *G06F 16/951* (2019.01); *G06K 9/00288* (2013.01); *G06K 9/3258* (2013.01); *G06K 9/6202* (2013.01); *G06T 11/60* (2013.01); *G06T 2200/24* (2013.01)

(58) Field of Classification Search
CPC . G06T 7/11; G06T 7/194; G06T 2207/20021; G06T 7/0004

USPC .............. 382/103, 165, 170, 209, 278, 282; 358/537, 538, 453, 473
See application file for complete search history.

(56) References Cited

U.S. PATENT DOCUMENTS

| 5,346,005 A * | 9/1994 | Robbins ............... E21B 33/127 166/187 |
| 5,983,227 A | 11/1999 | Nazem et al. |
| 6,216,133 B1 | 4/2001 | Masthoff |
| 6,236,978 B1 | 5/2001 | Tuzhilin |
| 6,288,717 B1 | 9/2001 | Dunkle |
| 6,411,949 B1 | 6/2002 | Schaffer |

(Continued)

OTHER PUBLICATIONS

Final Office Action for U.S. Appl. No. 12/437,418, dated Apr. 16, 2012.

(Continued)

*Primary Examiner* — Yosef Kassa
(74) *Attorney, Agent, or Firm* — LKGlobal | Lorenz & Kopf, LLP

(57) ABSTRACT

Methods and systems are provided for displaying pertinent data, using augmented reality, to supplement information in images acquired by an imaging device of a mobile communication device. The images can be analyzed to find one or more matched objects, and recognition can be performed on the matched objects to recognize target components. It can be determined whether the recognized target components match one or more known patterns. Based on the known patterns pertinent data pertaining to the known patterns can be retrieved from one or more data sources, and displayed at a display using augmented reality to supplement information in the images acquired by the imaging device.

20 Claims, 9 Drawing Sheets

(56) References Cited

U.S. PATENT DOCUMENTS

| | | | |
|---|---|---|---|
| 6,907,566 B1 | 6/2005 | McElfresh et al. | |
| 7,062,502 B1 | 6/2006 | Kesler | |
| 7,100,111 B2 | 8/2006 | McElfresh et al. | |
| 7,269,590 B2 | 9/2007 | Hull et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,454,509 B2 | 11/2008 | Boulter et al. | |
| 7,570,283 B2* | 8/2009 | Sato | H04N 1/00281 348/211.2 |
| 7,599,935 B2 | 10/2009 | La Rotonda et al. | |
| 7,603,331 B2 | 10/2009 | Tuzhilin et al. | |
| 7,644,122 B2 | 1/2010 | Weyer et al. | |
| 7,668,861 B2 | 2/2010 | Steven | |
| 7,747,648 B1 | 6/2010 | Kraft et al. | |
| 7,827,208 B2 | 11/2010 | Bosworth et al. | |
| 7,853,881 B1 | 12/2010 | Aly Assal et al. | |
| 7,856,445 B2 | 12/2010 | Gross | |
| 7,945,653 B2 | 5/2011 | Zuckerberg et al. | |
| 7,991,764 B2 | 8/2011 | Rathod | |
| 8,005,896 B2 | 8/2011 | Cheah | |
| 8,073,850 B1 | 12/2011 | Hubbard et al. | |
| 8,103,611 B2 | 1/2012 | Tuzhilin et al. | |
| 8,150,913 B2 | 4/2012 | Cheah | |
| 8,166,013 B2 | 4/2012 | Bandaru et al. | |
| 8,175,335 B2* | 5/2012 | Zhang | G06K 9/00 382/103 |
| 8,265,393 B2* | 9/2012 | Tribelhorn | G06K 9/00463 382/173 |
| 8,311,355 B2* | 11/2012 | Brunner | G06T 5/008 348/222.1 |
| 8,385,689 B2* | 2/2013 | Chandrashekar | G06K 9/4671 345/629 |
| 8,898,173 B1* | 11/2014 | Badoiu | G06F 16/9537 707/748 |
| 2008/0010270 A1 | 1/2008 | Gross | |
| 2008/0147487 A1 | 6/2008 | Hirshberg | |
| 2008/0209320 A1 | 8/2008 | Mawhinney et al. | |
| 2010/0125502 A1 | 5/2010 | Solomon et al. | |
| 2010/0217757 A1 | 8/2010 | Fujioka | |
| 2010/0241576 A1 | 9/2010 | Beeri | |
| 2011/0209067 A1 | 8/2011 | Bogess et al. | |
| 2011/0258204 A1 | 10/2011 | Hubbard et al. | |
| 2012/0290407 A1 | 11/2012 | Hubbard et al. | |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

Linear Combination-Wikipedia (http://en.wikipedia.org/wiki/Linear_Combination (accessed Jul. 16, 2012).

* cited by examiner

US 10,528,816 B2

SYSTEM AND METHOD FOR RETRIEVING AND DISPLAYING SUPPLEMENTAL INFORMATION AND PERTINENT DATA USING AUGMENTED REALITY

TECHNICAL FIELD

Embodiments of the subject matter described herein relate generally to mobile computing devices. More particularly, embodiments of the subject matter relate to methods and systems for retrieving supplemental information and displaying the supplemental information at the mobile computing device using augmented reality.

BACKGROUND

Users of mobile communication devices such as smartphones, tablet computers or laptop computers often want to find information that describes or supplements other information about the environment that they are currently using their mobile device within. This is commonly done by using a search engine to search for websites or other sources of information, and then retrieve information from one or more external data sources.

In some cases, the process of searching for appropriate information can be inconvenient and/or time consuming. For example, the retrieval and display of information can require access to multiple systems and/or require the user to perform many manual steps in searching for and retrieving the appropriate information.

It would be desirable to help automate this retrieval process and automatically provide the user with information that helps the user better understand something about, for example, a person, place or thing in their present environment. Furthermore, other desirable features and characteristics will become apparent from the subsequent detailed description and the appended claims, taken in conjunction with the accompanying drawings and the foregoing technical field and background. The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Augmented reality can refer to the integration of digital information with the user's environment in real time. Augmented reality technologies can be used, for example, to superimpose a computer-generated image on a user's view of the real world, thus providing a composite view. Unlike virtual reality, which creates a totally artificial environment, augmented reality uses the existing environment and overlays new information on top of it.

The disclosed embodiments relate to methods and systems for retrieving supplemental information and displaying the supplemental information at the mobile computing device using augmented reality. The disclosed embodiments can leverage various augmented reality technologies to display pertinent data or supplemental information about what is being observed via a camera of a user system (e.g., a mobile device) at a display associated with the user system. The pertinent data or supplemental information can be retrieved from data sources such as backend databases, backend server systems, cloud computing platforms, targets identified by search engines (such as Google Images service or Goggle reverse image search feature of Google Images service), social media platforms or services, and provided to the user system. The disclosed embodiments can simplify retrieval and display of information which would otherwise require access to multiple systems and many manual steps. In one embodiment, where recognition processing can be performed locally at the device in parallel with image capture and other processing, the disclosed methodologies can occur in near real-time (e.g., so that the user perceives a smooth view with no stuttering to the display).

In one embodiment, methods and systems are provided for displaying pertinent data, using augmented reality, to supplement information in images acquired by an imaging device of a mobile communication device. The images can be analyzed to find one or more matched objects, and recognition can be performed on the matched objects to recognize target components. It can be determined whether the recognized target components match one or more known patterns. Based on the known patterns, pertinent data pertaining to the known patterns can be retrieved from one or more data sources, and displayed at a display using augmented reality to supplement information in the images acquired by the imaging device.

Figure 1:
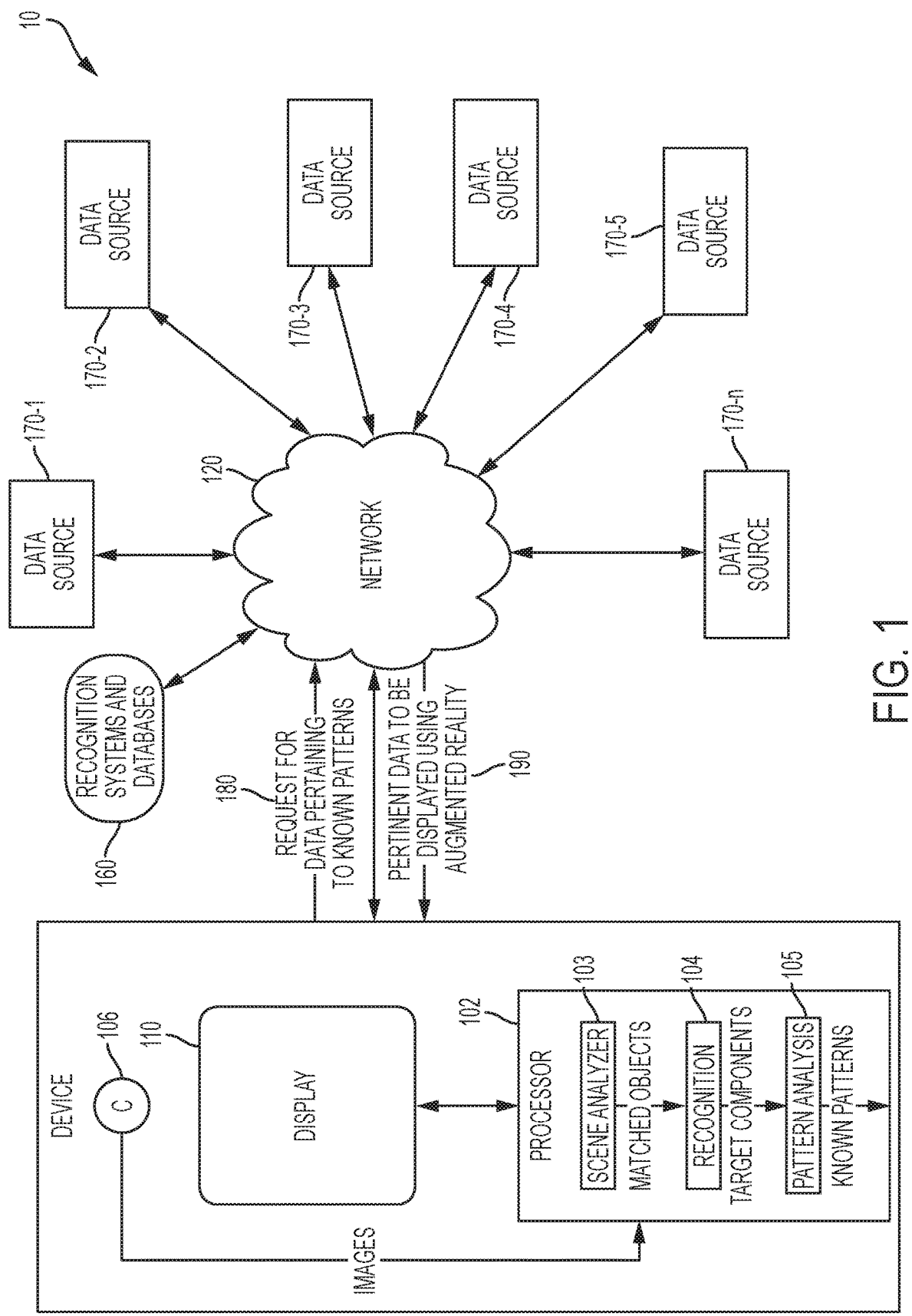
FIG. 1 is a schematic block diagram of an example of a computing environment in which features of the disclosed embodiments can be implemented in accordance with the disclosed embodiments.

FIG. 1 is a schematic block diagram of an example of a computing environment or system 10 in which features of the disclosed embodiments can be implemented in accordance with the disclosed embodiments. The system 10 includes a user system, which in the example illustrated in FIG. 1, is a mobile communication device 100 that can communicate via a network interface (not illustrated in FIG. 1) with various recognition systems and databases 160 and various data sources 170 over a network 120.

The mobile communication device 100 includes a processor 102, an imaging device 106, and a display 110 along with other conventional components that are part of the mobile communication device 100 such as network interfaces for communicating with remote server systems and databases over a network 120. Other examples of components that can be part of mobile communication device 100 will be described below with reference to example implementations that are shown FIGS. 8 and 9. However, it should be appreciated that the disclosed embodiments can be implemented in conjunction with other types of user systems, such as desktops, laptops, tablets, smartphones or other client devices, Google Glass™, and any other computing device implemented in an automobile, aircraft, television, or other business or consumer electronic device or system, including web clients.

The recognition systems and databases 160 can vary depending on the implementation and can include, for example, text recognition systems and databases, image recognition systems and databases, facial recognition systems and databases, landmark recognition systems and databases, recognition systems and databases, and any other known type of recognition systems and databases.

The data sources 170 can include various different types of data sources that can be used to provide information and data that can be used to supplement other information that is displayed and/or identified at the display 110. The one or more data sources data sources 170 can include any number of backend systems including server systems and databases, cloud-based computing platforms, search engines, targeted data sources identified by search engines, social media platforms or services, open government data, etc. A cloud-based computing platform can include a network interface that allows a user of a user system to establish a communicative connection to the cloud-based computing platform over a network 120 such as the Internet or any type of network described herein. The cloud-based computing platform includes an application platform that can give user systems access to various applications and database systems provided by the application platform via a cloud-based user interface. Examples of backend systems can include, for example, an on-premises exchange server, the system/servers used by a search engine (e.g., Google) to allow users to perform searches, the system/server used to retrieve Wikipedia articles based on user input, etc. Each backend system can include one or more servers that work in conjunction with one or more databases and/or data processing components.

Each of the recognition systems and databases 160 and data sources 170 can be implemented using any number of servers (or server systems) and databases, repositories or other data storage systems that provide data and/or services to the user systems. Each of the recognition systems and databases 160 and data sources 170 can be implemented using physical and/or virtual database server hardware or computer systems that are configured to communicate with user systems to perform the various functions described herein.

Each of the recognition systems and databases 160 and data sources 170 can operate with any sort of conventional processing hardware, such as a processor, memory, input/output features and the like. The processors may be implemented using any suitable processing system, such as one or more processors, controllers, microprocessors, microcontrollers, processing cores and/or other computing resources spread across any number of distributed or integrated systems, including any number of "cloud-based" or other virtual systems. Memory represents any non-transitory short or long-term storage or other computer-readable media capable of storing programming instructions for execution on the processor, including any sort of random access memory (RAM), read only memory (ROM), flash memory, magnetic or optical mass storage, and/or the like. The computer-executable programming instructions, when read and executed by the servers and/or processors, cause the server and/or processor to create, generate, or otherwise facilitate providing data and information as described herein. It should be noted that the memory represents one suitable implementation of such computer-readable media, and alternatively or additionally, a server could receive and cooperate with external computer-readable media that is realized as a portable or mobile component or platform, e.g., a portable hard drive, a USB flash drive, an optical disc, or the like. The input/output features generally represent the interface(s) to networks (e.g., to the network 120, or any other local area, wide area or other network), mass storage, display devices, data entry devices and/or the like.

Still referring to FIG. 1, the data and services provided by the recognition systems and databases 160 and data sources 170 can be retrieved using any sort of personal computer, smartphone, mobile telephone, tablet or other network-enabled user system on the network 120. In an exemplary embodiment, the user system 110 includes a display device, such as a monitor, screen, or another conventional electronic display capable of graphically presenting data and/or information retrieved from the recognition systems and databases 160 and data sources 170, as described in greater detail below.

As will be described below, the imaging device 106 of the mobile communication device 100 can acquire images that can be processed via the processor 102 and the recognition systems and databases 160, and then used to request data that is pertinent to the information acquired by the imaging device 106. This pertinent data can then be displayed using augmented reality at the display 110 to provide supplemental information to the user of the mobile communication device 100. As used herein, the phrase "using augmented reality" when used in conjunction with the term display or displaying can mean "presenting supplemental information on a normal view that is typically presented on a graphical user interface to provide a composite view that includes the supplemental information presented." For instance, in one context, the phrase "using augmented reality" when used in conjunction with the term display or displaying can mean "superimposing a computer-generated image or information on a normal view presented on a graphical user interface to provide a composite view that includes the computer-generated image or information in addition to the normal view that is presented."

In one embodiment, the imaging device 106 can be, for example, a camera of a mobile device that is configured to acquire images of the surrounding environment. The processor 102 can analyze the images acquired by the imaging device 106 to find one or more matched objects, and then perform recognition processing on the matched objects to recognize target components. The processor 102 can determine whether the recognized target components match one or more known patterns, and retrieve, based on the known patterns, pertinent data pertaining to the known patterns from the one or more data sources 170. The display 110 can display a user interface (e.g., GUI) that is configured to present the pertinent data, using augmented reality, to provide additional information that is relevant to the scene captured by the imaging device 106. The pertinent data that is displayed can supplement information in the images acquired by the imaging device 106. For instance, the pertinent data can describe other information about objects or people that are identified in images. In some implementations, this supplemental information may be overlaid on the images being required acquired via the imaging device 106. In other implementations, the supplemental information can be displayed independently of the images that are acquired via the imaging device 106.

For example, in one embodiment, the matched objects can include matched objects that resemble text. The processor 102 can perform text recognition on the matched objects that resemble text to recognize text, and determine whether the recognized text matches one or more known text patterns by communicating with one or more textual recognition systems and databases 160. The one or more textual recognition systems and databases 160 can generate text recognition results identifying the known text patterns that match the recognized text, and return them to the mobile communication device 100. The processor 102 can then retrieve, based on the known text patterns that match the recognized text, pertinent data pertaining to the known text patterns that match the recognized text from one or more of the data sources 170. The user interface displayed at the display 110 can present, using augmented reality, at least some of the pertinent data to supplement information in the images acquired by the imaging device 106.

In another embodiment, the matched objects can include matched objects that resemble a person. The processor 102 can perform facial recognition on the matched objects that resemble the person to recognize facial features the person, and determine whether the recognized features match one or more known facial patterns by communicating with one or more facial recognition systems and databases 160. The one or more textual recognition systems and databases 160 can generate facial recognition results identifying a specific person having a known facial pattern that matches the recognized features, and return them to the mobile communication device 100. The processor 102 can then retrieve pertinent data pertaining to the specific person from the one or more data sources 170. The user interface displayed at the display 110 can present, using augmented reality, at least some of the pertinent data pertaining to the specific person to supplement information in the images acquired by the imaging device 106.

In another embodiment, the matched objects can include matched objects that resemble an apparatus and identifiable information in the images. The processor 102 can perform recognition on the matched objects that resemble the apparatus and the identifiable information to recognize the apparatus and the identifiable information, and determine whether the recognized apparatus matches any known apparatus by communicating with one or more recognition systems and databases 160. The one or more recognition systems and databases 160 can generate recognition results identifying the known apparatus that matches the recognized apparatus as a specific apparatus, and return them to the mobile communication device 100. The processor 102 can then retrieve, based on the identifiable information, supplemental information that relates to the specific apparatus from the one or more data sources 170. The user interface (displayed at the display 110) can present, using augmented reality, at least some of the supplemental information that relates to the specific apparatus to supplement information in the images acquired by the imaging device 106.

In another embodiment, the matched objects can include matched objects that resemble potential landmarks in the images. The processor 102 can receive an input that indicates a desired destination, perform recognition on the matched objects that resemble the potential landmarks in the images to recognize landmarks in the images, and determine whether each of the recognized landmarks matches any known landmarks by communicating with one or more recognition systems and databases 160. The one or more recognition systems and databases 160 can generate recognition results identifying specific landmarks that match any known landmarks and location of each specific landmark, and return them to the mobile communication device 100. The processor 102 can then retrieve, based on locations of each specific landmark and the desired destination, one or more paths between the recognized landmarks and the desired destination from the one or more data sources 170, and also retrieve (from the one or more data sources 170) supplemental information that is encountered along each path that can be displayed while traversing that path. The user interface can present at the display 110, using augmented reality, a path as it is traversed along with at least some of the supplemental information that is encountered along that path while traversing that path.

In another embodiment, the matched objects can include matched objects are potentially indicative of a current location in the images. The processor 102 can perform recognition based on the matched objects that are potentially indicative of current location in the images to recognize target components of each object, and determine whether each of the recognized target components match any known patterns by communicating with one or more recognition systems and databases 160. The one or more recognition systems and databases 160 can generate recognition results identifying specific objects having target components determined to match any known patterns as being objects indicative of current location, and return them to the mobile communication device 100. The processor 102 can then determine the current location based on the specific objects, and receive a selection of one or more filters to be applied for generating supplemental information. The processor 102 can then retrieve, from the one or more data sources 170, supplemental information that is to be displayed. When determining supplemental information at the one or more data sources 170, the one or more data sources 170 can apply the one or more filters to determine appropriate supplemental information. The supplemental information is determined based on the one or more filters and can indicate, for example, other hidden features associated with the current location that are obstructed from view and not visible. The user interface can present the supplemental information at the display 110 using augmented reality.

In one embodiment, the user of the mobile device can specify, based on user input, a sub-set of pertinent data or supplemental information that is allowed to be displayed at the display of the mobile device. This can help address privacy concerns. Depending on the system accessed, the user may specify what "public" information may be displayed.

FIGS. 2-7 are flow charts that illustrate examples of methods for displaying pertinent data pertaining to components recognized in images acquired by a camera using augmented reality to supplement information in the images in accordance with the disclosed embodiments. With respect to FIGS. 2-7, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIGS. 2-7 that follows, the mobile communication device 100 (and various elements thereof), recognition systems and databases 160, and data sources data sources 170 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIGS. 2-7, a particular example is described in which a user system mobile communication device 100 performs certain actions by interacting with other elements of the system 10.

Figure 2:
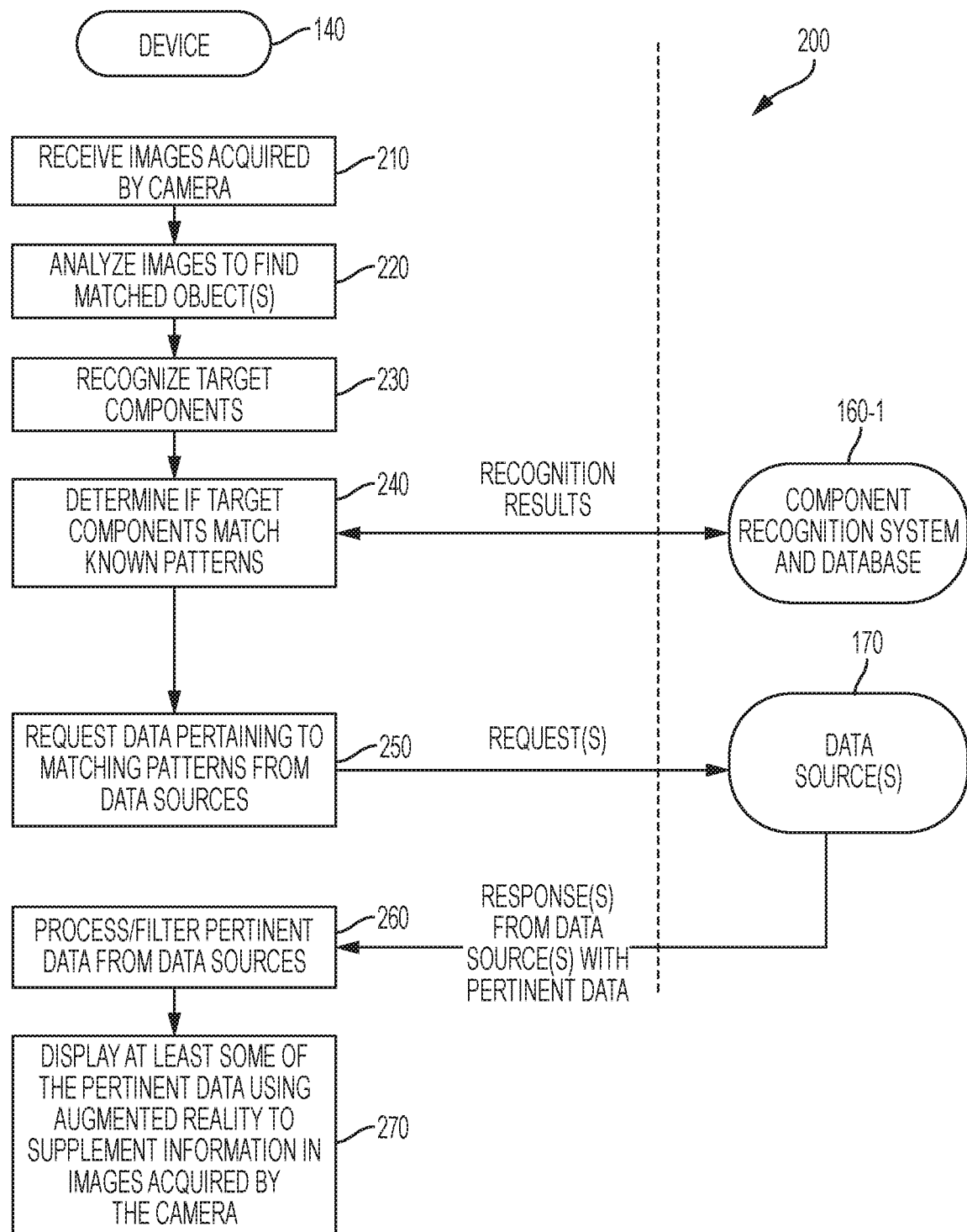
FIG. 2 is a flowchart illustrating a method for displaying pertinent data pertaining to components recognized in images acquired by an imaging device using augmented reality to supplement information in the images in accordance with the disclosed embodiments.

FIG. 2 is a flowchart illustrating a method 200 for displaying pertinent data pertaining to components recognized in images acquired by an imaging device 106 using augmented reality to supplement information in the images in accordance with the disclosed embodiments. It should be appreciated that the method 200 can be executed continuously to update the pertinent data that is displayed via the GUI at display 110 so that the pertinent data corresponds to the images as they are acquired by the imaging device 106.

The method 200 begins at 210, where the imaging device 106 of the mobile communication device 100 acquires images and provides the images to the processor 102. At 220, the analyzer module 103 processes (e.g., analyzes) the images to find matched objects, and provides the matched objects to the recognition module 104. At 230, the recognition module 104 performs pattern recognition on the matched objects to generate target components, and the target components are then provided to the pattern analysis module 105.

At 240, the pattern analysis module 105 processes the target components and performs a pattern analysis of the target components to identify patterns, and then provide the identified patters to the component recognition system and database 160-1, which processes the identified patterns to determine whether they match any known patterns that are stored, and for any of the identified patterns that do match known patterns, generates recognition results identifying those known patterns. The recognition results can then be returned to the pattern analysis module 105 where they can be used by the processor 102. In one implementation, steps 230 and 240 can be performed by a combined recognition and pattern analysis module. In another implementation, the recognition module 104 and the pattern analysis module 105 are separate modules, and the pattern analysis module 105 is an application specific module that determines whether the identified patterns match any known patterns that are relevant to a specific application.

At 250, the processor 102 can retrieve, based on the known patterns, pertinent data pertaining to the known patterns from one or more data sources data sources 170. For example, the processor 102 can generate request messages that are sent to the various data sources 170 to request data pertaining to the known patterns from the recognition results. The data sources 170 can then search for pertinent data pertaining to the known patterns, and generate response messages that include the pertinent data.

At 260, the processor 102 can then process and/or filter the pertinent data from the responses messages as appropriate, and then cause at least some of the pertinent data to be displayed (at 270) via a user interface at the display 110 using augmented reality. The pertinent data that is displayed using augmented reality supplements information in the images that were acquired by the camera.

Several different implementations of the general concept that is illustrated in FIG. 2 will now be described with reference to FIGS. 3-7. FIG. 3-7 will be described with continued reference to FIG. 1.

Figure 3:
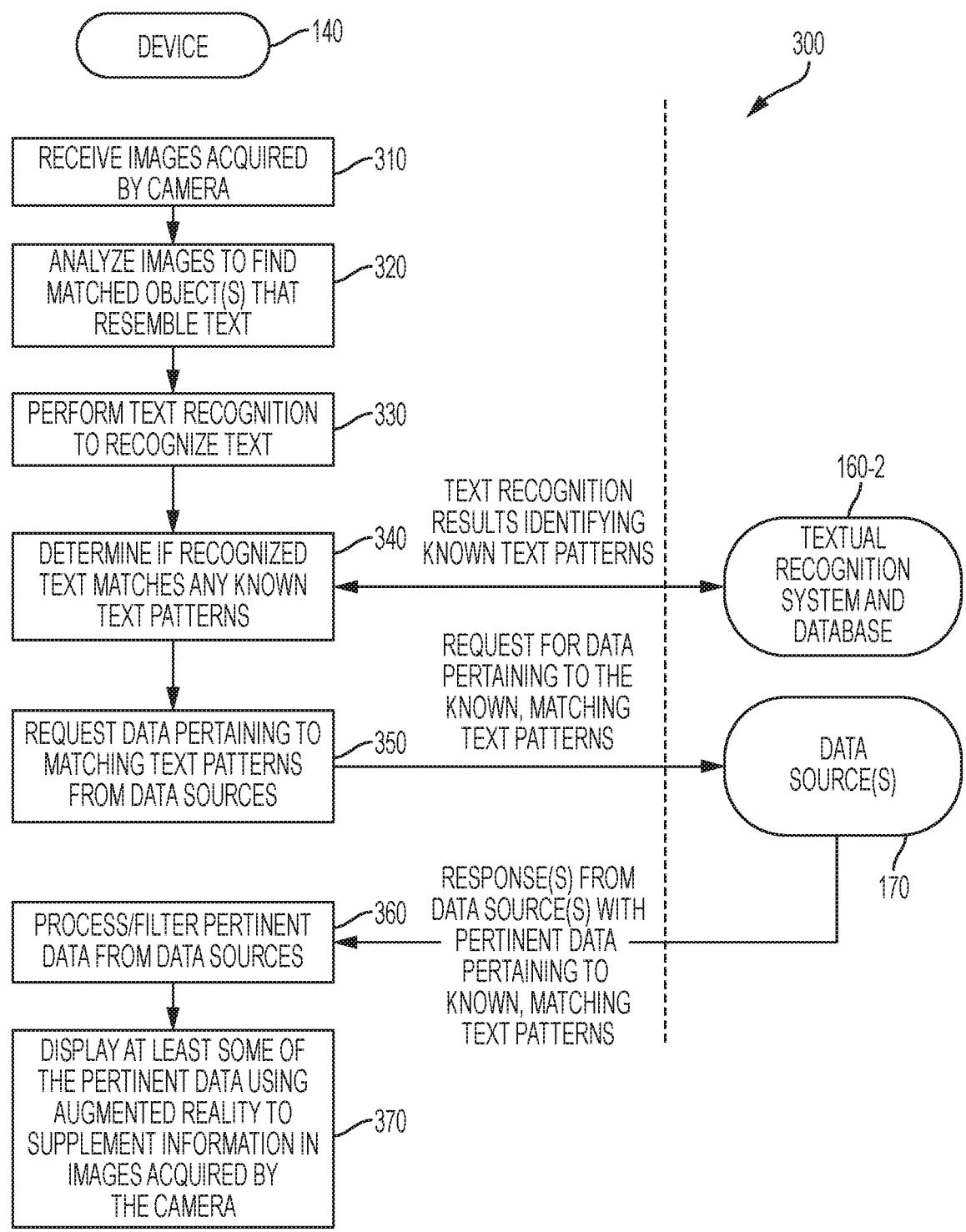
FIG. 3 is a flowchart illustrating a method for displaying pertinent data pertaining to a known text pattern recognized in images acquired by an imaging device using augmented reality to supplement information in the images acquired by the imaging device in accordance with the disclosed embodiments.

FIG. 3 is a flowchart illustrating a method 300 for displaying pertinent data pertaining to a known text pattern recognized in images acquired by an imaging device 106 using augmented reality to supplement information in the images acquired by the imaging device 106 in accordance with the disclosed embodiments. It should be appreciated that the method 300 can be executed continuously to update the pertinent data that is displayed via the GUI at display 110 so that the pertinent data corresponds to the images as they are acquired by the imaging device 106.

The method 300 begins at 310, where the imaging device 106 of the mobile communication device 100 acquires images and provides the images to the processor 102. At 320, the analyzer module 103 processes (e.g., analyzes) the images to find matched objects that resemble text, and provides the matched objects to the recognition module 104.

At 330, the recognition module 104 performs text recognition on the matched objects to recognize text, and the recognized text is then provided to the pattern analysis module 105. At 340, the pattern analysis module 105 processes the recognized text and performs a pattern analysis of the recognized text to identify patterns, and then provides the identified patterns to the textual recognition system and database 160-2, which processes the identified patterns to determine whether they match any known text patterns that are stored, and for any of the identified patterns that do not match known text patterns, generates text recognition results identifying those known text patterns that match the recognized text. The text recognition results can then be returned to the pattern analysis module 105 where they can be used by the processor 102. In one implementation, steps 330 and 340 can be performed by a combined recognition and pattern analysis module. In another implementation, the recognition module 104 and the pattern analysis module 105 are separate modules, and the pattern analysis module 105 is an application specific module that determines whether the recognized text matches any known text patterns and is relevant to a specific application.

At 350, the processor 102 can retrieve, based on the known text patterns that match the recognized text, pertinent data pertaining to the known text patterns that match the recognized text from one or more data sources data sources 170. For example, the processor 102 can generate request messages that are sent to the various data sources 170 to request data pertaining to the known, matching text patterns from the recognition results. For instance, in one example of a retrieval process, after having identified text matching a known pattern, a request is made to one or more data sources (e.g., a server or servers) with the identified text and the known user (if applicable) to retrieve further information. The data sources 170 can then search for pertinent data pertaining to the known, matching text patterns, and generate response messages that include the pertinent data.

At 360, the processor 102 can then process and/or filter the pertinent data from the responses messages as appropriate, and then cause at least some of the pertinent data to be displayed (at 370) via a user interface at the display 110 using augmented reality. The pertinent data that is displayed using augmented reality supplements information (e.g., such as the known, matching text patterns) in the images that were acquired by the camera. The pertinent data could be displayed, for example, in a two-dimensional or three-dimensional space depending on the implementation. For example, in one non-limiting use case, a known, matching text pattern could be text that indicates the location of a desk or office, and the pertinent data could be information that indicates who occupies the desk or office, information about his/her title, contact information, company assets (e.g., laptop, phone, desktop) assigned to the occupant or location, or any other information about the location that is displayed using augmented reality. In another non-limiting use case, a known, matching text pattern could be text that indicates a room number of a conference room, and the pertinent data could be booking information for that room that is displayed using augmented reality.

Figure 4:
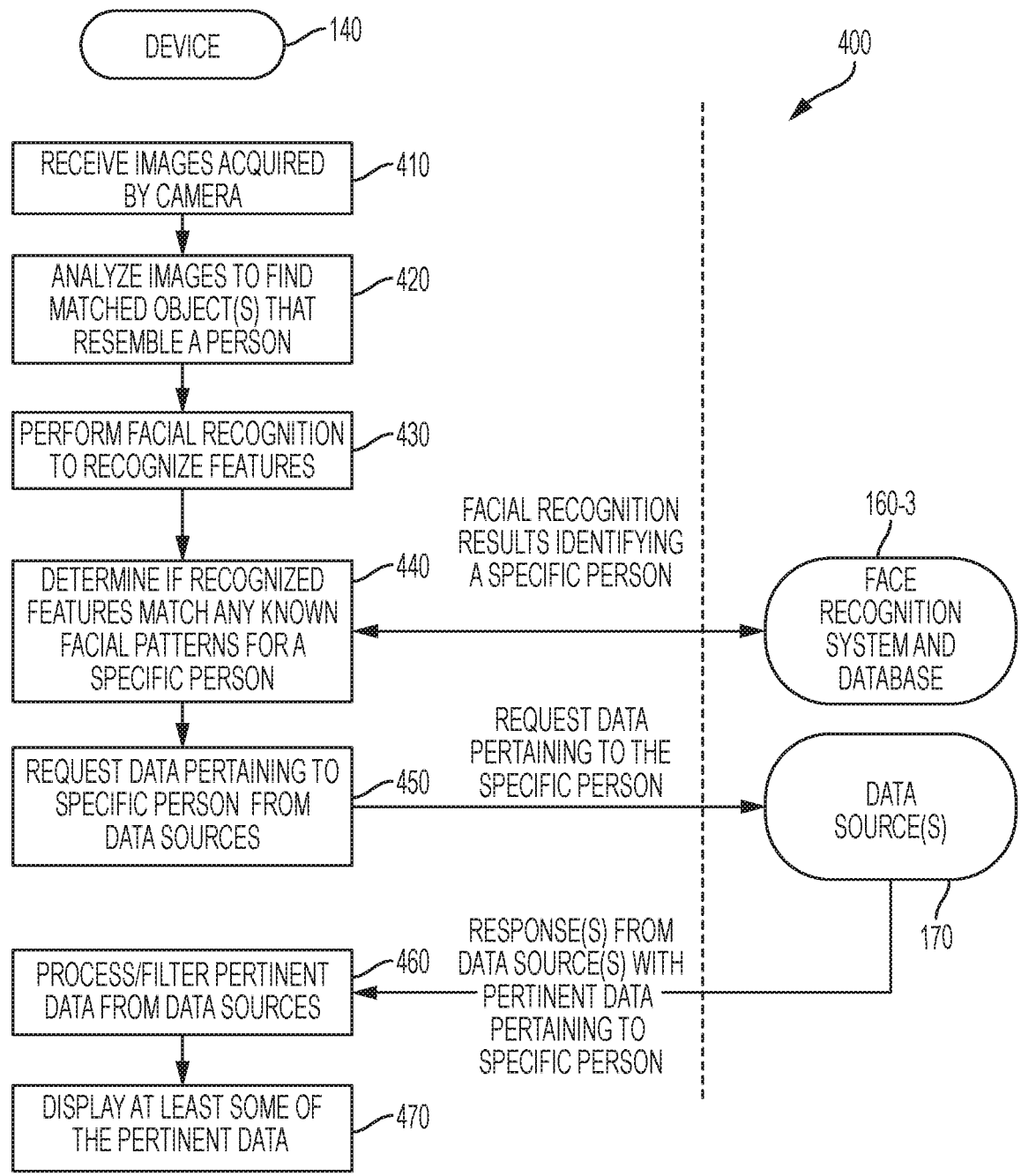
FIG. 4 is a flowchart illustrating a method for displaying pertinent data pertaining to a specific person recognized in images acquired by an imaging device using augmented reality to supplement information in the images acquired by the imaging device in accordance with the disclosed embodiments.

FIG. 4 is a flowchart illustrating a method 400 for displaying pertinent data pertaining to a specific person recognized in images acquired by an imaging device 106 using augmented reality to supplement information in the images acquired by the imaging device 106 in accordance with the disclosed embodiments. It should be appreciated that the method 400 can be executed continuously to update the pertinent data that is displayed via the GUI at display 110 so that the pertinent data corresponds to the images as they are acquired by the imaging device 106.

The method 400 begins at 410, where the imaging device 106 of the mobile communication device 100 acquires images and provides the images to the processor 102. At 420, the analyzer module 103 processes (e.g., analyzes) the images to find matched objects that resemble person, and provides the matched objects to the recognition module 104.

At 430, the recognition module 104 performs facial recognition on the matched objects that resemble a person to recognize facial features, and the recognized facial features are then provided to the pattern analysis module 105. At 440, the pattern analysis module 105 processes the recognized facial features and performs a pattern analysis of the recognized facial features to identify facial patterns, and then provides the identified facial patterns to the face recognition system and database 160-3, which processes the identified facial patterns to determine whether they match any known facial patterns of a specific person that are stored, and for any of the identified facial patterns that do match known facial patterns, generates facial recognition results identifying a specific person having a known facial pattern that matches the recognized features. The facial recognition results can then be returned to the pattern analysis module 105 where they can be used by the processor 102. In one implementation, steps 430 and 440 can be performed by a combined recognition and pattern analysis module. In another implementation, the recognition module 104 and the pattern analysis module 105 are separate modules, and the pattern analysis module 105 is an application specific module that determines whether the identified facial patterns match any known facial patterns for a specific person that are stored and for a specific application.

At 450, the processor 102 can retrieve pertinent data pertaining to the specific person from the one or more data sources data sources 170. For example, the processor 102 can generate request messages that are sent to the various data sources 170 to request data pertaining to the specific person from the recognition results (e.g., the specific person having the known, matching facial patterns). The data sources 170 can then search for pertinent data pertaining to the specific person, and generate response messages that include the pertinent data.

At 460, the processor 102 can then process and/or filter the pertinent data from the responses messages as appropriate, and then cause at least some of the pertinent data to be displayed (at 470) via a user interface at the display 110, for example, using augmented reality. The pertinent data that is displayed can provide supplemental information about or associated with the specific person identified in the images that were acquired by the camera. For example, once the person in the image has been identified, additional data (e.g., CRM data) associated with that person can then be looked-up and presented via a user interface of the device. For instance, in one non-limiting use case, the specific person could be a salesperson, and the pertinent data could be contact information for that salesperson or any other information about that salesperson that is displayed using augmented reality. In another non-limiting use case, specific person could be any person who has one or more social media profiles, and the pertinent data could be information extracted from their social media profiles that is displayed using augmented reality.

Figure 5:
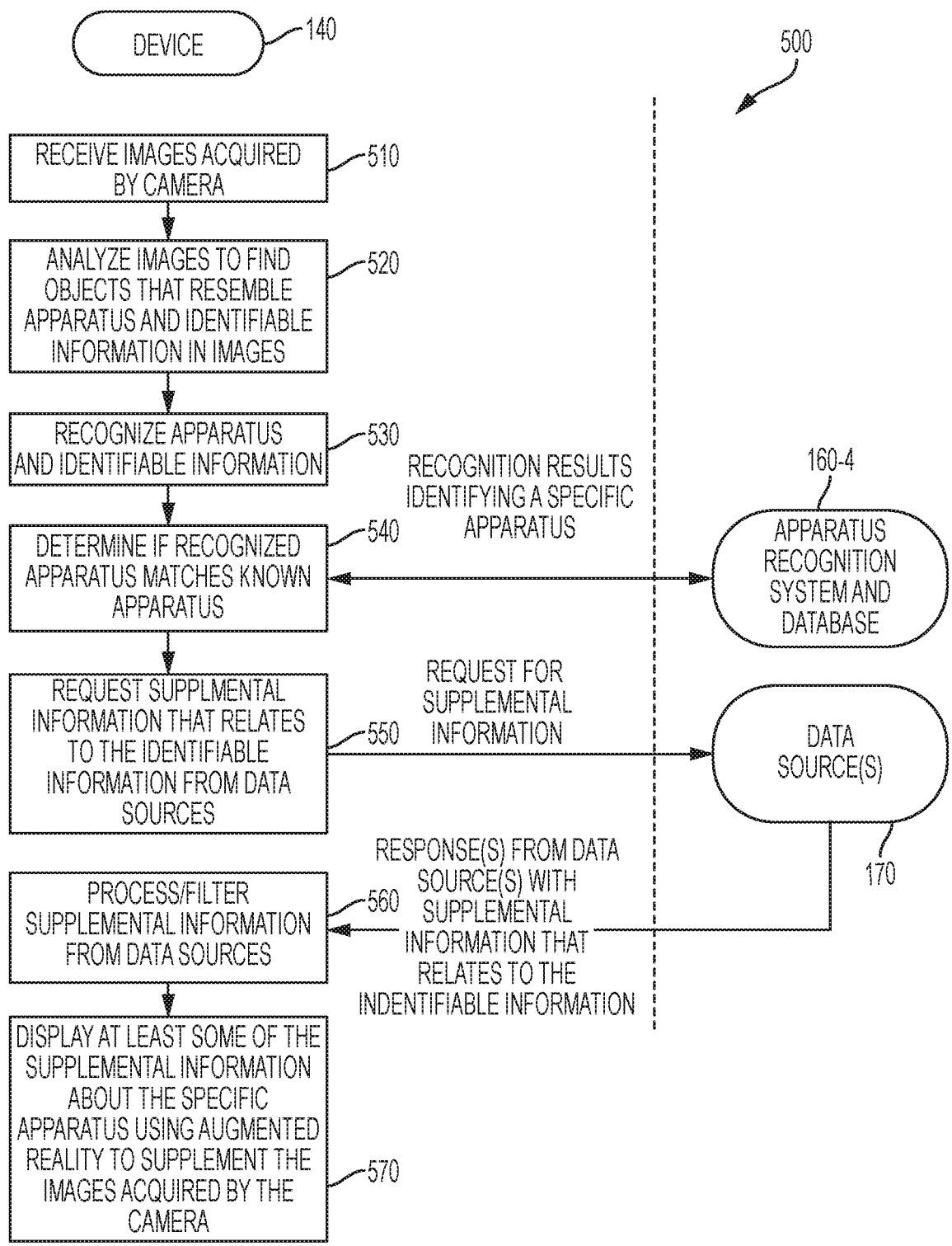
FIG. 5 is a flowchart illustrating a method for displaying supplemental information that relates to a specific apparatus recognized in images acquired by an imaging device using augmented reality to supplement information in the images acquired by the imaging device in accordance with the disclosed embodiments.

FIG. 5 is a flowchart illustrating a method 500 for displaying supplemental information that relates to a specific apparatus recognized in images acquired by an imaging device 106 using augmented reality to supplement information in the images acquired by the imaging device 106 in accordance with the disclosed embodiments. It should be appreciated that the method 500 can be executed continuously to update the supplemental information that is displayed via the GUI at display 110 so that the supplemental information corresponds to the images as they are acquired by the imaging device 106.

The method 500 begins at 510, where the imaging device 106 of the mobile communication device 100 acquires images and provides the images to the processor 102. At 520, the analyzer module 103 processes (e.g., analyzes) the images to find (1) matched objects that resemble an apparatus (e.g., equipment, a device, hardware such as a desktop or laptop computer, office phone, assets assigned to a person, etc.) and/or (2) other identifiable information (e.g., name or picture of the person that the apparatus is assigned to or any other information that identifies something about the apparatus), and provides the matched objects to the recognition module 104. Alternatively, identifiable information could be scanned by the device (e.g., by scanning a QR code).

At 530, the recognition module 104 performs recognition on the matched objects to recognize the apparatus and/or the other identifiable information, and the recognized apparatus and/or other identifiable information are then provided to the pattern analysis module 105. At 540, the pattern analysis module 105 processes the recognized apparatus and performs a pattern analysis of the recognized apparatus to identify known patterns, and then provides the identified patterns to the apparatus recognition system and database 160-4, which processes the identified patterns to determine whether the recognized apparatus match any known patterns for a specific apparatus that are stored, and for any of the identified patterns that do match known patterns for a specific apparatus, generates recognition results identifying the specific apparatus. For example, in one embodiment, the processor can compare the recognized apparatus to a pretrained intelligent data model to identify a known apparatus as a specific apparatus. The recognition results can then be returned to the pattern analysis module 105 where they can be used by the processor 102. In one implementation, steps 530 and 540 can be performed by a combined recognition and pattern analysis module. In another implementation, the recognition module 104 and the pattern analysis module 105 are separate modules, and the pattern analysis module 105 is an application specific module that determines whether the recognized apparatus matches any known patterns for a specific apparatus and are relevant to a specific application being used to identify the specific apparatus.

In some embodiments, at 540, the pattern analysis module 105 also processes the recognized identifiable information and performs a pattern analysis of the recognized identifiable information to identify known patterns, and then provides the identified patterns to the an information recognition system and database (not shown), which processes the identified patterns to determine whether they match any known patterns for information that are stored, and for any of the identified patterns that do match known patterns for specific information, generates recognition results identifying the specific identifiable information. The recognition results can then be returned to the pattern analysis module 105 where they can be used by the processor 102

At 550, the processor 102 can retrieve, based on the identifiable information, supplemental information that relates to the specific apparatus from the one or more data sources data sources 170. For example, the processor 102 can use the identifiable information to retrieve supplemental information from data sources (e.g., supplemental information that identifies the location, owner of the space, and the apparatus allocated to the owner, etc.) In one embodiment, the processor 102 can generate request messages that are sent to the various data sources 170 to request supplemental information that relates to the specific apparatus and/or the specific identifiable information from the recognition results (e.g., supplemental information about the specific apparatus having the specific identifiable information). The data sources 170 can then search for the supplemental information, and generate response messages that include the supplemental information.

At 560, the processor 102 can then process and/or filter the supplemental information from the responses messages as appropriate, and then cause at least some of the supplemental information to be displayed (at 570) via a user interface at the display 110, for example, using augmented reality. The supplemental information that is displayed can provide additional information about or associated with the specific apparatus identified in the images that were acquired by the camera.

For example, in one non-limiting use case, specific apparatus could be computer monitor, and the other identifiable information could be a brand or model identifier. The supplemental information that is displayed using augmented reality could identify the monitor(s) that are assigned to a specific user.

In another non-limiting use case, a user who is part of an asset management team could use their mobile device to acquire identifiable information that specifies an room, office or cube number, and a specific piece of office equipment (e.g., a computer monitor) located in the corresponding space. This identifiable information could then be used to retrieve supplemental information about the occupant of that space from a data source and display it along with other information about the office equipment located in that space. Here, the specific apparatus could be the office equipment or other assets located in that space, and the supplemental information about the occupant of that space could be information about the occupant and the office equipment or other assets that are assigned to that occupant. Some or all of this information could be displayed using augmented reality. The asset management team member could then use the information about the office equipment that is actually located in the space and compare it to the office equipment that is assigned to that occupant to determine what does belong and what does not. For instance, the supplemental information could include a list of assigned assets with a check mark against those that are identified as being present and flags that indicate which assets are missing.

Figure 6:
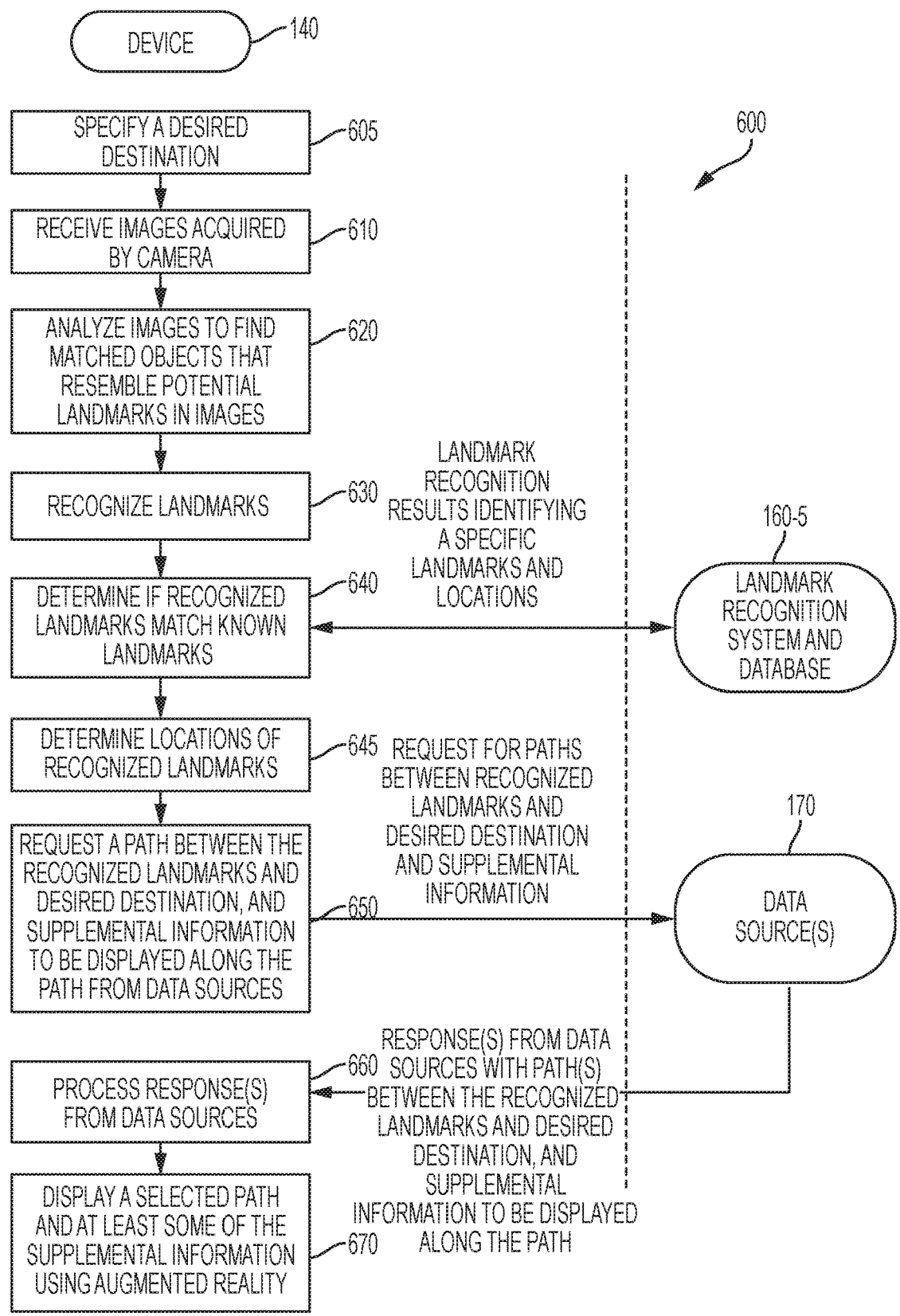
FIG. 6 is a flowchart illustrating a method for displaying a path as it is traversed along with supplemental information that is encountered along that path while traversing that path using augmented reality in accordance with the disclosed embodiments.

FIG. 6 is a flowchart illustrating a method 600 for displaying a path as it is traversed along with supplemental information that is encountered along that path while traversing that path using augmented reality in accordance with the disclosed embodiments. It should be appreciated that the method 600 can be executed continuously to update the supplemental information that is displayed via the GUI at display 110.

The method 600 begins at 605, where the processor 102 of the mobile communication device 100 determines a desired destination of a user. At 610, the imaging device 106 acquires images and provides the images to the processor 102. At 620, the analyzer module 103 processes (e.g., analyzes) the images to find matched objects that resemble potential landmarks, and provides the matched objects to the recognition module 104. As used herein, a "landmark" can refer to "an object or feature that can be identified in an image and used to identify or establish location or relative location within an environment." In some cases, a landmark can be used to establish orientation within a space, or to indicate directions for moving toward a destination.

At 630, the recognition module 104 performs landmark recognition on the matched objects that resemble potential landmarks to recognize landmarks, and the recognized landmarks are then provided to the pattern analysis module 105.

At 640, the pattern analysis module 105 processes the recognized landmarks and performs a pattern analysis of the recognized landmarks to identify patterns, and then provides the identified patterns to the landmark recognition system and database 160-5, which processes the identified patterns to determine whether each of the recognized landmarks match any known landmarks from specific landmarks that are stored, and for any of the identified patterns that do match known landmarks, generates landmark recognition results identifying one or more specific landmarks and respective location(s) of those specific landmarks. In one embodiment, the recognized landmarks can be compared to a pre-trained intelligent data model to identify a known landmarks as a specific landmarks. In one implementation, steps 630 and 640 can be performed by a combined recognition and pattern analysis module. In another implementation, the recognition module 104 and the pattern analysis module 105 are separate modules, and the pattern analysis module 105 is an application specific module that determines whether each of the recognized landmarks match any known specific landmarks that are relevant to a specific application.

The landmark recognition results can then be returned to the pattern analysis module 105 where they can be used by the processor 102. At 645, the processor 102 can determine the locations of the recognized landmarks (from the landmark recognition results).

At 650, the processor 102 can retrieve, based on locations of each specific landmark and the desired destination, one or more paths between the recognized landmarks and the desired destination from the one or more data sources data sources 170, and also retrieve, from the one or more data sources data sources 170, supplemental information that is encountered along each path that can be displayed while traversing that path. For example, the processor 102 can generate request messages that are sent to one or more of the various data sources 170 to request a path between one or more of the recognized landmarks and the desired destination, and other request messages to also request supplemental information that is encountered along each path that can be displayed while traversing that path. One or more of the data sources 170 can search for paths between one or more of the recognized landmarks and the desired destination, and generate response messages that described one or more available paths between one or more of the recognized landmarks and the desired destination. For example, in one embodiment, one or more of the data sources 170 can search for supplemental information, and generate response messages that include the supplemental information.

At 660, as a user moves along or traverses one of the paths, the processor 102 can then process and/or filter the supplemental information from the responses messages as appropriate, and then cause at least some of the supplemental information to be displayed (at 670) via a user interface at the display 110, for example, using augmented reality. In other words, as the path is traversed it can be displayed at the display 110 along with at least some of the supplemental information that is encountered along that path while traversing that path, and this supplemental information can be displayed using augmented reality. The supplemental information that is displayed can provide, for example, supplemental information about or associated with anything that is encountered along the path such as objects that are encountered. For example, in one non-limiting use case, the method 600 could be used by a user in large facility or office building to enter a desired destination, and then acquire an image of their current location that includes a particular landmark. The method 600 could then be used to display a path between the current location and desired destination and along with other supplemental information such as shortcuts, other identifiable landmarks, etc. In one non-limiting embodiment, the supplemental information could as simple as arrows indicating the direction the user must follow to reach the destination (e.g., like turn by turn directions provided by a navigation system), and could also optionally include the number of steps or the distance to the destination to give the user a better idea of the distance.

Figure 7:
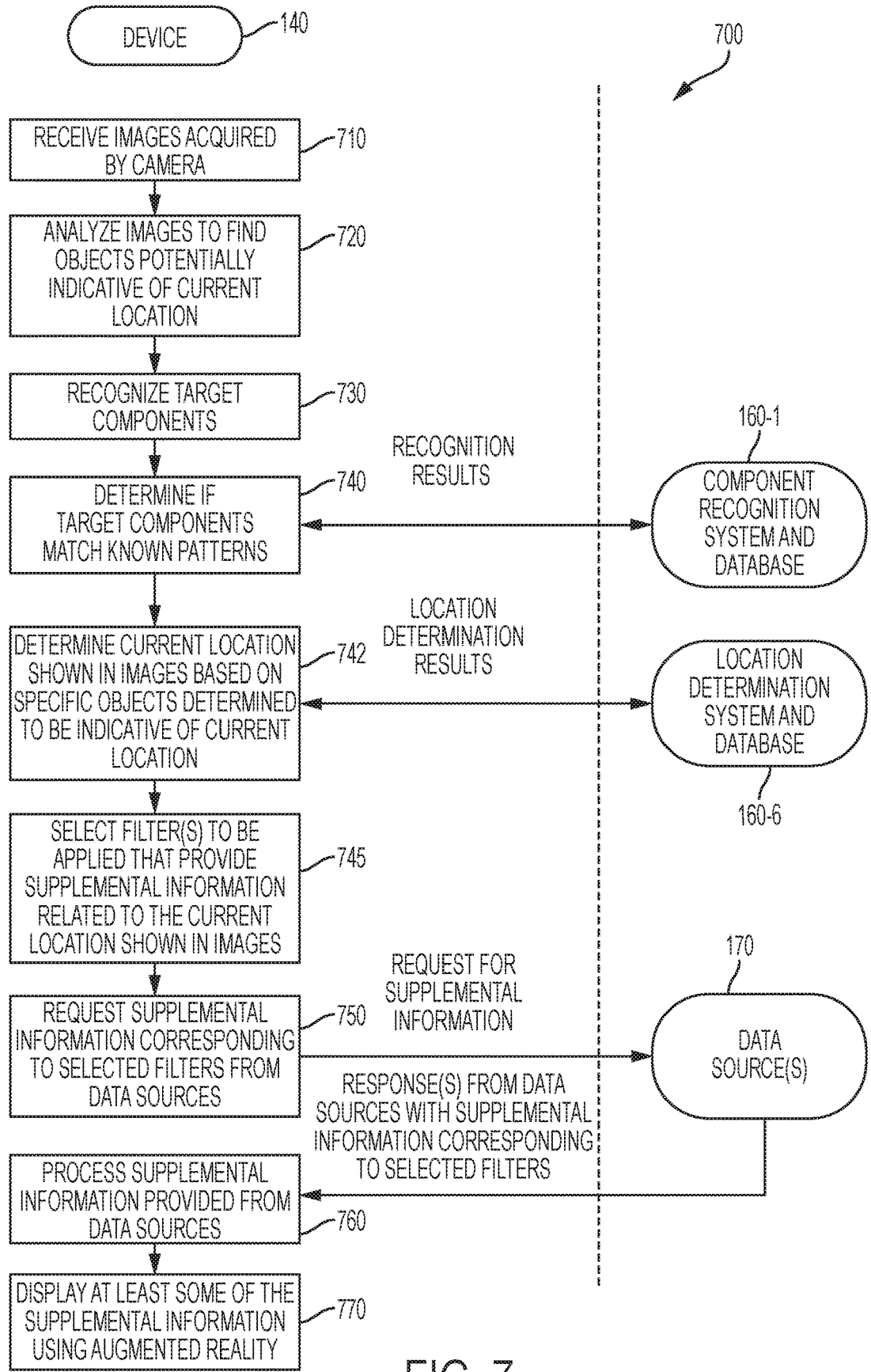
FIG. 7 is a flowchart illustrating a method for displaying an image of a location along with supplemental information that indicates other hidden features associated with that location using augmented reality in accordance with the disclosed embodiments.

FIG. 7 is a flowchart illustrating a method 700 for displaying an image of a location along with supplemental information that indicates other hidden features associated with that location using augmented reality in accordance with the disclosed embodiments. It should be appreciated that the method 700 can be executed continuously to update the supplemental data that is displayed via the GUI at display 110 so that the supplemental data corresponds to the images as they are acquired by the imaging device 106. The supplemental information can indicate other hidden features at a location that are obstructed from view and not visible to the human eye. For instance, in one implementation, the hidden features can be located, for example, underneath the location. The hidden features that are displayed can vary depending on which filter within an augmented reality view a user has selected. For instance, one filter would allow the user to view structure underlying a particular location. For a building with geo-location, the user could be see an augmented reality view of girders, water pipes, electrical system, etc. By contrast, if the camera of the device is pointed at the road, the user could be see an augmented reality view of the subway, sewer lines, water pipes, etc.

The method 700 begins at 710, where the imaging device 106 of the mobile communication device 100 acquires images and provides the images to the processor 102.

At 720, the analyzer module 103 processes (e.g., analyzes) the images to find matched objects or information that are potentially indicative of current location in the images, and provides the matched objects that are potentially indicative of current location in the images to the recognition module 104.

At 730, the recognition module 104 performs pattern recognition on the matched objects to generate target components, and the target components are then provided to the pattern analysis module 105. For example, the recognition module 104 can perform recognition based on the matched objects that are potentially indicative of current location in the images to recognize target components of each object.

At 740, the pattern analysis module 105 processes the target components and performs a pattern analysis of the target components to identify patterns, and then provides the identified patterns to the component recognition system and database 160-1. The component recognition system and database 160-1 processes the identified patterns to determine whether they match any known patterns that are stored, and for any of the identified patterns that do match known patterns, generates recognition results identifying those known patterns. For instance, in one embodiment, the recognized target components can be compared to a pre-trained intelligent data model to identify specific objects having target components determined to match any known patterns, and identify those specific objects as being indicative of current location. In one implementation, steps 730 and 740 can be performed by a combined recognition and pattern analysis module. In another implementation, the recognition module 104 and the pattern analysis module 105 are separate modules, and the pattern analysis module 105 is an application specific module that determines whether the identified patterns match any known patterns that are relevant to a specific application.

The recognition results can then be returned to the pattern analysis module 105 where they can be used by the processor 102. At 742, the current location shown in the images can be determined based on specific objects that are determined to be indicative of the current location. For example, in one embodiment, the processor 102 can determine the current location based on the specific objects by providing the specific objects to a location determination system and database imaging device 106-6 that analyzes the specific objects to find matching objects within a database. Each matching object can have a specific location associated with it.

At 745, the processor 102 can receive a selection of one or more filters to be applied for generating supplemental information. The selection can be based on a user input or selection, or can be automated based on information determined by the device, for example, based on information included in the images that are acquired by the camera.

At 750, supplemental information that is to be displayed is retrieved from the one or more data sources data sources 170. One or more filters are applied at the one or more data sources data sources 170 to determine the supplemental information based on the one or more filters. For example, in one implementation, the processor 102 can generate request messages that are sent to one or more of the various data sources 170 to request supplemental information, and the data sources 170 can then apply the filter(s) and search for the supplemental information. The data sources 170 can then generate response messages that include the supplemental information, and send the response messages to the processor 102.

At 760, the processor 102 can then process supplemental information from the responses messages as appropriate, and then cause at least some of the supplemental information to be displayed (at 770) via a user interface at the display 110 using augmented reality. The supplemental information that is displayed using augmented reality supplements information in the images that were acquired by the camera and indicates other hidden features associated with the current location that are obstructed from view and not visible (e.g., that are located, for example, underneath the current location).

Figure 8:
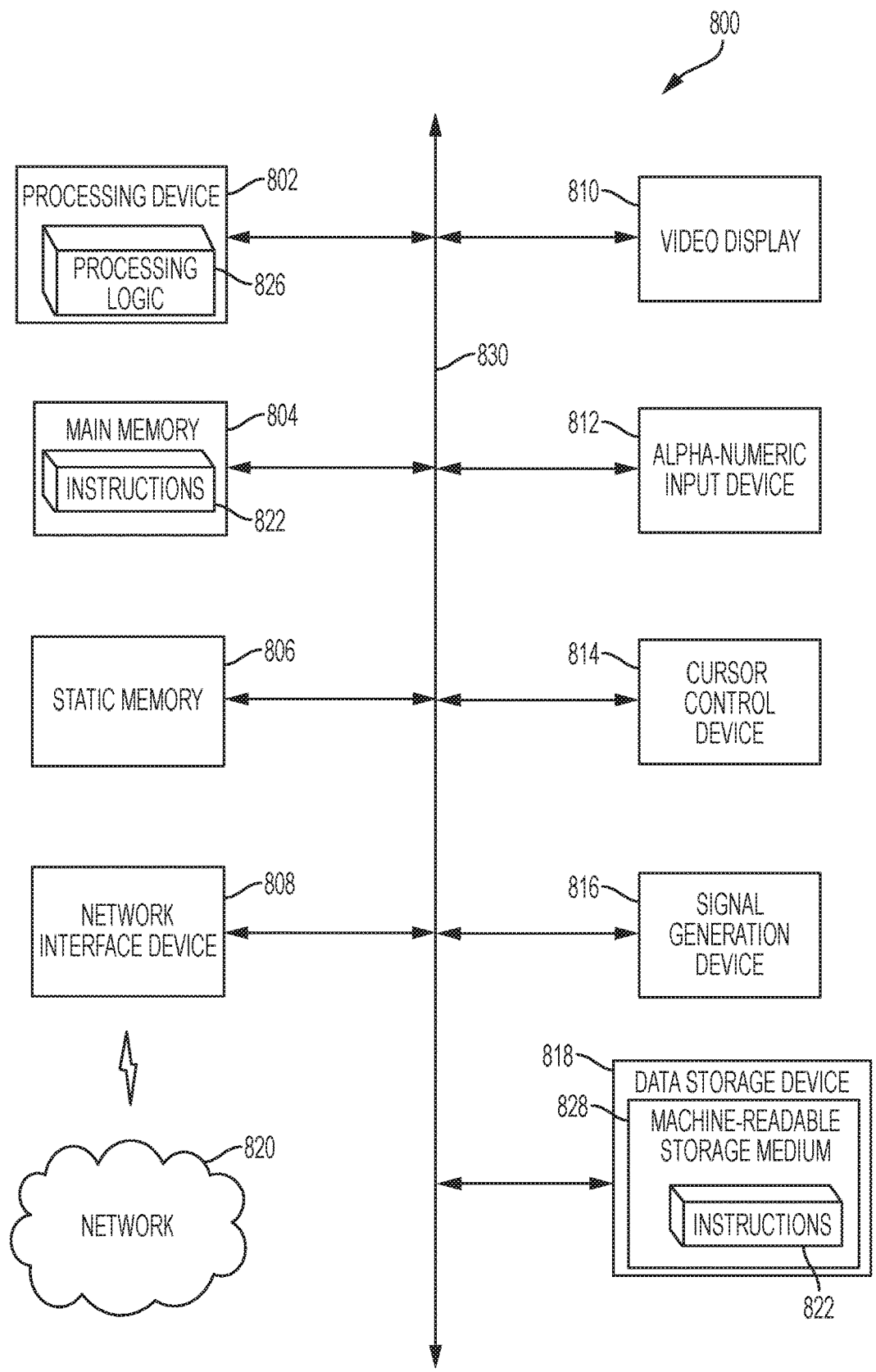
FIG. 8 illustrates a diagrammatic representation of a machine in the exemplary form of a computer system within which a set of instructions, for causing the machine to perform any one or more of the methodologies discussed herein, may be executed.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may represent a user system 100, one of the recognition systems and databases 160 (or a components thereof) or one of the data sources 170 (or a components thereof) as shown in FIG. 1.

The exemplary computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of in-memory buffer service 114) embodying any one or more of the methodologies or functions described herein. The instructions 822 may also reside, completely or at least partially, within the main memory 804 and/or within processing logic 826 of the processing device 802 during execution thereof by the computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 9:
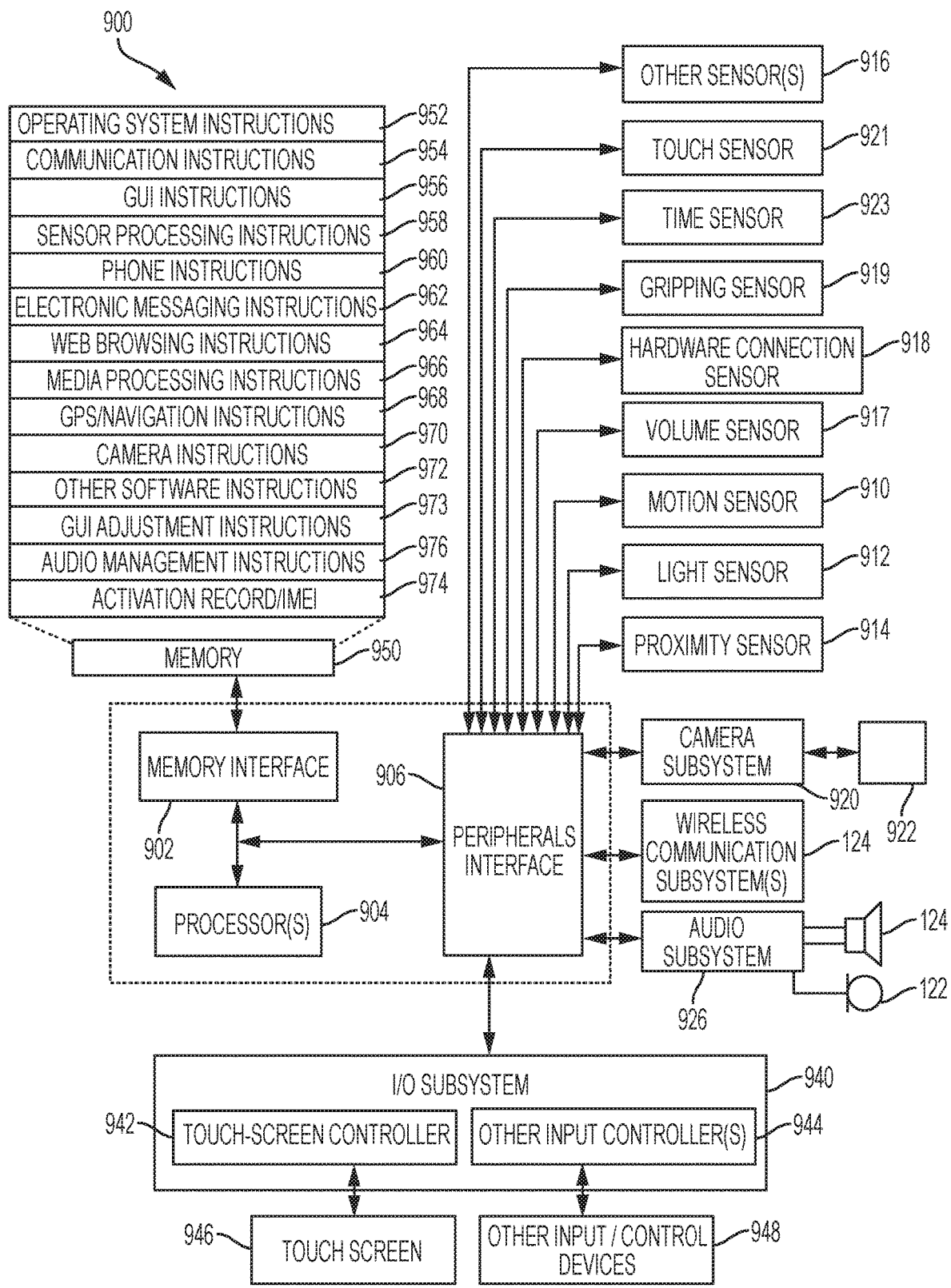
FIG. 9 is a block diagram of an example implementation of a mobile device of FIG. 1 in accordance with the disclosed embodiments.

FIG. 9 is a block diagram of an example implementation 900 of the mobile communication device 100 of FIG. 1. The mobile communication device 100 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the mobile communication device 100 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the orientation, lighting, and proximity functions. A hardware connection sensor 918 can be coupled to the peripherals interface 906, to facilitate determining a state of connecting the mobile communication device 100 to any hardware, e.g., a docking station, a charger, a personal computer, etc. A gripping sensor 919 can be coupled to the peripherals interface 906, to determine if the mobile communication device 100 is being gripped. In various implementation, a gripping sensor can include a temperature sensor, and/or a pressure sensor. Further, a touch sensor 921 can be coupled to the peripherals interface 906, to detect if a user is touching user input interface, e.g., a touch screen or a keypad. A time sensor 923 can also be coupled to the peripherals interface 906, to detect a duration of a certain state of the mobile communication device 100. Other sensors 916 can also be connected to the peripherals interface 906, such as a positioning system (e.g., GPS receiver), a temperature sensor, a biometric sensor, a gyroscope, or other sensing device, to facilitate related functionalities.

A camera subsystem 920 and an optical sensor 922, e.g., a charged coupled device CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the mobile communication device 100 is intended to operate. In particular, the wireless communication subsystems 924 may include hosting protocols such that the device 100 may be configured as a base station for other wireless devices.

An audio subsystem 926 can be coupled to a loudspeaker 124, and microphone 122 to facilitate voice-enabled functions, for example, hands-free functionalities, voice recognition, voice replication, digital recording, and telephony functions.

The I/O subsystem 940 can include a touch screen controller 942 and/or other input controller(s) 944. The touch-screen controller 942 can be coupled to a touch screen 946. The touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 946.

The other input controller(s) 944 can be coupled to other input; control devices 948, such as one or more buttons, rocker switches, thumb-wheel, infrared port, USB port; and/or a pointer device such as a stylus. The one or more buttons (not shown) can include an up/down button for volume control of the speaker 126 and loudspeaker 124 and/or the microphone 122.

In some implementations, the mobile communication device 100 can present recorded audio and/or video files, such as MP3, AAC, and MPEG files. In some implementations, the mobile communication device 100 can include the functionality of an MP3 player, such as an iPod™. The mobile communication device 100 may, therefore, include a 96-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks. The operating system 952 may include instructions for handling basic system services and for performing hardware dependent tasks. In some implementations, the operating system 952 can be a kernel (e.g., UNIX kernel).

The memory 950 may also store communication instructions 954 to facilitate communicating with one or more additional devices, one or more computers and/or one or more servers. The memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/navigation instructions 968 to facilitate GPS and navigation-related processes and instructions; camera instructions 970 to facilitate camera-related processes and functions; GUI adjustment instructions 973 to facilitate adjustment of graphical user interfaces and user interface elements in response to sensor data; and/or other software instructions 972 to facilitate other processes and functions.

In addition, the memory 950 can store audio management instructions 976 to facilitate functions managing audio subsystem, including the loudspeaker 124, and the microphone 122. In some implementations, the audio management instructions 976 are operable to toggle the speakerphone system and adjust speaker volume and/or microphone sensitivity, in response to the sensor processing instructions 958.

The memory 950 may also store other software instructions (not shown), such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) 974 or similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the mobile communication device 100 may be implemented in hardware and/or in software, including in one or more signal processing and/or application specific integrated circuits.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, comprising:
   receiving images acquired by an imaging device of a mobile communication device;
   analyzing the images, at a processor, to find one or more matched objects;
   performing recognition on the matched objects, at the processor, to recognize target components;
   determining, at the processor, whether the recognized target components match one or more known patterns;
   retrieving, based on the known patterns, pertinent data pertaining to the known patterns from one or more data sources; and
   displaying, at a display using augmented reality, at least some of the pertinent data to supplement information in the images acquired by the imaging device.

2. A method according to claim 1, wherein analyzing the images, comprises:
   analyzing the images, at the processor, to find the matched objects that resemble text;
   wherein performing recognition on the matched objects, at the processor, to recognize target components, comprises:
   performing text recognition on the matched objects that resemble text, at the processor, to recognize text;
   wherein determining comprises:
   determining, at the processor, whether the recognized text matches one or more known text patterns, and generating text recognition results identifying the known text patterns that match the recognized text;
   wherein retrieving comprises:
   retrieving, based on the known text patterns that match the recognized text, pertinent data pertaining to the known text patterns that match the recognized text from one or more data sources;
   wherein displaying comprises:
   displaying, at the display using augmented reality, at least some of the pertinent data pertaining to the known text patterns to supplement information in the images acquired by the imaging device.

3. A method according to claim 1, wherein analyzing the images, comprises:

analyzing the images, at the processor, to find the matched objects that resemble a person;
wherein performing recognition on the matched objects, at the processor, to recognize the target components, comprises:
performing facial recognition on the matched objects that resemble the person, at the processor, to recognize facial features the person;
wherein determining comprises:
determining, at the processor, whether the recognized features match one or more known facial patterns, and generating facial recognition results identifying a specific person having a known facial pattern that matches the recognized features;
wherein retrieving comprises:
retrieving pertinent data pertaining to the specific person from the one or more data sources;
wherein displaying comprises:
displaying, at the display using augmented reality, at least some of the pertinent data pertaining to the specific person to supplement information in the images acquired by the imaging device.

4. A method according to claim 1, wherein analyzing the images, comprises:
analyzing the images, at the processor, to find matched objects that resemble an apparatus and identifiable information in the images;
wherein performing recognition on the matched objects, at the processor, to recognize the target components, comprises:
performing recognition on the matched objects that resemble the apparatus and the identifiable information, at the processor, to recognize the apparatus and the identifiable information;
wherein determining comprises:
determining, at the processor, whether the recognized apparatus matches any known apparatus, and generating recognition results identifying the known apparatus that matches the recognized apparatus as a specific apparatus;
wherein retrieving comprises:
retrieving, based on the identifiable information, supplemental information that relates to the specific apparatus from the one or more data sources;
wherein displaying comprises:
displaying, at the display using augmented reality, at least some of the supplemental information that relates to the specific apparatus to supplement information in the images acquired by the imaging device.

5. A method according to claim 1, further comprising:
specifying a desired destination;
wherein analyzing the images, comprises:
analyzing the images, at the processor, to find matched objects that resemble potential landmarks in the images;
wherein performing recognition on the matched objects, at the processor, to recognize the target components, comprises:
performing recognition on the matched objects that resemble the potential landmarks in the images, at the processor, to recognize landmarks in the images;
wherein determining comprises:
determining, at the processor, whether each of the recognized landmarks matches any known landmarks, and generating recognition results identifying specific landmarks that match any known landmarks and location of each specific landmark;
wherein retrieving comprises:
retrieving, based on locations of each specific landmark and the desired destination, one or more paths between the recognized landmarks and the desired destination from the one or more data sources; and retrieving, from the one or more data sources, supplemental information that is encountered along each path that can be displayed while traversing that path;
wherein displaying comprises:
displaying, at the display using augmented reality, a path as it is traversed along with at least some of the supplemental information that is encountered along that path while traversing that path.

6. A method according to claim 1, wherein analyzing the images, comprises:
analyzing the images, at the processor, to find matched objects that are potentially indicative of a current location in the images;
wherein performing recognition on the matched objects, at the processor, to recognize the target components, comprises:
performing recognition based on the matched objects that are potentially indicative of current location in the images, at the processor, to recognize target components of each object;
wherein determining comprises:
determining, at the processor, whether each of the recognized target components match any known patterns, and generating recognition results identifying specific objects having target components determined to match any known patterns as being objects indicative of current location;
further comprising:
determining the current location based on the specific objects; and
receiving a selection of one or more filters to be applied for generating supplemental information; and
wherein retrieving comprises:
applying the one or more filters at the one or more data sources, and retrieving, from the one or more data sources, supplemental information that is to be displayed, wherein the supplemental information is determined based on the one or more filters;
wherein displaying comprises:
displaying, at the display using augmented reality, the supplemental information, wherein the supplemental information indicates other hidden features associated with the current location that are obstructed from view and not visible.

7. A method according to claim 1, wherein the one or more data sources comprise:
a backend database;
a backend server system;
a cloud computing platform;
targets identified by a search engine; and
a social media platform or service.

8. A computing system, comprising:
a network interface configured to communicate with one or more data sources;
an imaging device configured to acquire images;
a memory comprising computer-executable instructions;
a processor configured to execute the computer-executable instructions to cause the processor to: analyze the images acquired by the imaging device to find one or more matched objects; perform recognition processing on the matched objects to recognize target components; determine whether the recognized target components match one or more known patterns; and retrieve, based on the known patterns, pertinent data pertaining to the known patterns from the one or more data sources; and a display configured to display a user interface that is configured to present, using augmented reality, at least some of the pertinent data to supplement information in the images acquired by the imaging device.

9. A computing system according to claim 8, wherein the matched objects comprise: matched objects that resemble text, and wherein the processor is configured to execute the computer-executable instructions to cause the processor to: perform text recognition on the matched objects that resemble text to recognize text; determine whether the recognized text matches one or more known text patterns; generate text recognition results identifying the known text patterns that match the recognized text; and retrieve, based on the known text patterns that match the recognized text, pertinent data pertaining to the known text patterns that match the recognized text from one or more data sources.

10. A computing system according to claim 8, wherein the matched objects comprise: matched objects that resemble a person, and wherein the processor is configured to execute the computer-executable instructions to cause the processor to: perform facial recognition on the matched objects that resemble the person to recognize facial features the person; determine whether the recognized features match one or more known facial patterns; generate facial recognition results identifying a specific person having a known facial pattern that matches the recognized features; and retrieve pertinent data pertaining to the specific person from the one or more data sources; and wherein the user interface is configured to present, using augmented reality, at least some of the pertinent data pertaining to the specific person to supplement information in the images acquired by the imaging device.

11. A computing system according to claim 8, wherein the matched objects comprise: matched objects that resemble an apparatus and identifiable information in the images, and wherein the processor is configured to execute the computer-executable instructions to cause the processor to: perform recognition on the matched objects that resemble the apparatus and the identifiable information to recognize the apparatus and the identifiable information; determine whether the recognized apparatus matches any known apparatus; generate recognition results identifying the known apparatus that matches the recognized apparatus as a specific apparatus; and retrieve, based on the identifiable information, supplemental information that relates to the specific apparatus from the one or more data sources, and wherein the user interface is configured to present, using augmented reality, at least some of the supplemental information that relates to the specific apparatus to supplement information in the images acquired by the imaging device.

12. A computing system according to claim 8, wherein the matched objects comprise: matched objects that resemble potential landmarks in the images, and wherein the processor is configured to execute the computer-executable instructions to cause the processor to: receive an input that indicates a desired destination; perform recognition on the matched objects that resemble the potential landmarks in the images to recognize landmarks in the images; determine whether each of the recognized landmarks matches any known landmarks; generate recognition results identifying specific landmarks that match any known landmarks and location of each specific landmark; retrieve, based on locations of each specific landmark and the desired destination, one or more paths between the recognized landmarks and the desired destination from the one or more data sources; and retrieve, from the one or more data sources, supplemental information that is encountered along each path that can be displayed while traversing that path; and wherein the user interface is configured to present, using augmented reality, a path as it is traversed along with at least some of the supplemental information that is encountered along that path while traversing that path.

13. A computing system according to claim 8, wherein the matched objects are potentially indicative of a current location in the images, and wherein the processor is configured to execute the computer-executable instructions to cause the processor to: perform recognition based on the matched objects that are potentially indicative of current location in the images to recognize target components of each object; determine whether each of the recognized target components match any known patterns; generate recognition results identifying specific objects having target components determined to match any known patterns as being objects indicative of current location; determine the current location based on the specific objects; receive a selection of one or more filters to be applied for generating supplemental information; apply the one or more filters at the one or more data sources; retrieve, from the one or more data sources, supplemental information that is to be displayed; and wherein the user interface is configured to present, using augmented reality, the supplemental information, wherein the supplemental information is determined based on the one or more filters and indicates other hidden features associated with the current location that are obstructed from view and not visible.

14. A computing system according to claim 8, wherein the processor is further configured to execute the computer-executable instructions to cause the processor to filter the pertinent data retrieved from one or more data sources prior to displaying.

15. A system, comprising:
one or more data sources comprising at least one of: a backend database; a backend server system; a cloud computing platform; targets identified by a search engine; and a social media platform or service; and
a mobile communication device configured to communicate with the one or more data sources, the mobile communication device comprising:
an imaging device configured to acquire images;
a processor configured to: analyze the images acquired by the imaging device to find one or more matched objects; perform recognition processing on the matched objects to recognize target components; determine whether the recognized target components match one or more known patterns; and retrieve, based on the known patterns, pertinent data pertaining to the known patterns from the one or more data sources; and
a display configured to display a user interface that is configured to present, using augmented reality, at least some of the pertinent data to supplement information in the images acquired by the imaging device.

16. A system according to claim 15, wherein the matched objects comprise: matched objects that resemble text, and wherein the processor is configured to: perform text recognition on the matched objects that resemble text to recognize text; determine whether the recognized text matches one or more known text patterns; generate text recognition results identifying the known text patterns that match the recognized text; and retrieve, based on the known text patterns that match the recognized text, pertinent data pertaining to the known text patterns that match the recognized text from one or more data sources.

17. A system according to claim 15, wherein the matched objects comprise: matched objects that resemble a person, and wherein the processor is configured to: perform facial recognition on the matched objects that resemble the person to recognize facial features the person; determine whether the recognized features match one or more known facial patterns; generate facial recognition results identifying a specific person having a known facial pattern that matches the recognized features; and retrieve pertinent data pertaining to the specific person from the one or more data sources; and wherein the user interface is configured to present, using augmented reality, at least some of the pertinent data pertaining to the specific person to supplement information in the images acquired by the imaging device.

18. A system according to claim 15, wherein the matched objects comprise: matched objects that resemble an apparatus and identifiable information in the images, and wherein the processor is configured to: perform recognition on the matched objects that resemble the apparatus and the identifiable information to recognize the apparatus and the identifiable information; determine whether the recognized apparatus matches any known apparatus; generate recognition results identifying the known apparatus that matches the recognized apparatus as a specific apparatus; and retrieve, based on the identifiable information, supplemental information that relates to the specific apparatus from the one or more data sources, and wherein the user interface is configured to present, using augmented reality, at least some of the supplemental information that relates to the specific apparatus to supplement information in the images acquired by the imaging device.

19. A system according to claim 15, wherein the matched objects comprise: matched objects that resemble potential landmarks in the images, and wherein the processor is configured to: receive an input that indicates a desired destination; perform recognition on the matched objects that resemble the potential landmarks in the images to recognize landmarks in the images; determine whether each of the recognized landmarks matches any known landmarks; generate recognition results identifying specific landmarks that match any known landmarks and location of each specific landmark; retrieve, based on locations of each specific landmark and the desired destination, one or more paths between the recognized landmarks and the desired destination from the one or more data sources; and retrieve, from the one or more data sources, supplemental information that is encountered along each path that can be displayed while traversing that path; and wherein the user interface is configured to present, using augmented reality, a path as it is traversed along with at least some of the supplemental information that is encountered along that path while traversing that path.

20. A system according to claim 15, wherein the matched objects are potentially indicative of a current location in the images, and wherein the processor is configured to: perform recognition based on the matched objects that are potentially indicative of current location in the images to recognize target components of each object; determine whether each of the recognized target components match any known patterns; generate recognition results identifying specific objects having target components determined to match any known patterns as being objects indicative of current location; determine the current location based on the specific objects; receive a selection of one or more filters to be applied for generating supplemental information; apply the one or more filters at the one or more data sources; retrieve, from the one or more data sources, supplemental information that is to be displayed; and wherein the user interface is configured to present, using augmented reality, the supplemental information, wherein the supplemental information is determined based on the one or more filters and indicates other hidden features associated with the current location that are obstructed from view and not visible.

* * * * *